CONNECTION SYSTEM FOR SELECTION OF A JUNCTION LINE

Filed Feb. 21, 1952 12 Sheets-Sheet 1

INVENTOR
KARL AXEL LUNDKVIST
BY Fredrick E. Hane
ATTORNEY

INVENTOR
KARL AXEL LUNDKVIST
BY [signature]
ATTORNEY

CONNECTION SYSTEM FOR SELECTION OF A JUNCTION LINE

Filed Feb. 21, 1952 12 Sheets-Sheet 3

INVENTOR
KARL AXEL LUNDKVIST
BY [signature]
ATTORNEY

CONNECTION SYSTEM FOR SELECTION OF A JUNCTION LINE

Filed Feb. 21, 1952 12 Sheets-Sheet 4

INVENTOR
KARL AXEL LUNDKVIST
BY Frederick L. Haas
ATTORNEY

INVENTOR
KARL AXEL LUNDKVIST
BY Frederick E. Hane
ATTORNEY

June 3, 1958 K. A. LUNDKVIST 2,837,602

CONNECTION SYSTEM FOR SELECTION OF A JUNCTION LINE

Filed Feb. 21, 1952 12 Sheets-Sheet 6

INVENTOR
KARL AXEL LUNDKVIST
BY [signature]
ATTORNEY

June 3, 1958 K. A. LUNDKVIST 2,837,602

CONNECTION SYSTEM FOR SELECTION OF A JUNCTION LINE

Filed Feb. 21, 1952 12 Sheets-Sheet 7

INVENTOR
KARL AXEL LUNDKVIST
BY Frederick E. Hane
ATTORNEY

June 3, 1958 K. A. LUNDKVIST 2,837,602

CONNECTION SYSTEM FOR SELECTION OF A JUNCTION LINE

Filed Feb. 21, 1952 12 Sheets-Sheet 8

INVENTOR
KARL AXEL LUNDKVIST
BY [signature]
ATTORNEY

INVENTOR
KARL AXEL LUNDKVIST
BY Frederick L. Hays
ATTORNEY

INVENTOR
KARL AXEL LUNDKVIST
BY [signature]
ATTORNEY

June 3, 1958 K. A. LUNDKVIST 2,837,602

CONNECTION SYSTEM FOR SELECTION OF A JUNCTION LINE

Filed Feb. 21, 1952 12 Sheets-Sheet 11

INVENTOR
KARL AXEL LUNDKVIST
BY Fredrick L. Haus
ATTORNEY

INVENTOR
KARL AXEL LUNDKVIST
BY Frederick S. Haug
ATTORNEY

United States Patent Office 2,837,602

Patented June 3, 1958

2,837,602

CONNECTION SYSTEM FOR SELECTION OF A JUNCTION LINE

Karl Axel Lundkvist, Stockholm, Sweden, assignor to Telefonaktiebolaget L M Ericsson, Stockholm, Sweden, a company of Sweden Application February 21, 1952, Serial No. 272,857

Claims priority, application Sweden February 23, 1951

3 Claims. (Cl. 179—18)

The present invention relates to automatic telephone systems comprising cross-bar switches and markers. In that kind of systems the selection stages consist of primary and secondary partial selection stages, and in each connection through such a selection stage only one operating bar for cross-bar switches is busied in each partial selection stage. The subscribers' lines are connected to primary cross-bar switches in a selection stage with two-direction traffic. Said primary selection stage is connected by means of links to a secondary selection stage, to which two groups of connecting links with one-way traffic are connected, one group for incoming traffic to the subscribers' lines and one for outgoing traffic from said lines. A marker is furthermore provided for the selection stage and selects a free operating bar for cross-bar switches in each partial selection stage and a link between said operating bars when a connection is to be set up through the selection stage.

In automatic telephone systems with mechanical selectors the maintenance costs are of such an importance, that the greatest possible centralizing of the selector equipments have been aimed at, which has led to large telephone exchanges with a considerable number of long and expensive subscribers' lines. The cross-bar switch systems have required much lower maintenance costs and therefore a de-centralizing can be achieved by arranging auxiliary exchanges, the number of exchanges thus increasing and the average length of the subscribers' lines decreasing.

The object of the present invention is to make full use of the great reliability in operation of the cross-bar switch in such a way, that a considerable diffusion of the exchange material is attained with a strong reduction of the need for material within the network but with a very small increase of the need for supervising staff and exchange control material. As an example of the use of the invention we may state dwelling quarters, where an old settlement with low houses is replaced by higher houses. It is thereby desirable to increase the number of telephone instruments without being obliged to increase the network.

In new town networks great savings can be realized by removing a selection stage to the line boxes and thereby reduce the need for lines. According to our invention this is attained by providing a main exchange and an auxiliary exchange, a selection stage consisting of operating bars in cross-bar switches at each one of said exchanges, junction lines between the selection stage at the auxiliary exchange and connecting means connected to the selection stage at the main exchange, and a marker for each selection stage as well as a number of special control lines between said markers. Furthermore, signal emitting relays are provided in the marker at the main exchange, signal receiving relays in the marker at the auxiliary exchange, contacts on said signal emitting relays closing circuits over the special control lines for setting said signal receiving relays in a combination indicating a subscriber's line at the auxiliary exchange, marking relays in at least one of said markers with contacts closing a circuit for each junction line which is free and can be connected with said subscriber's line, selecting relays in one of said markers for selecting one of said circuits corresponding to a junction line, which can be connected with free connecting means at the main exchange, selecting relays at the main exchange for selecting free connecting means and connecting said means to a junction line corresponding to the selected circuit over an operating bar for cross-bar switches pertaining to the selection stage at the main exchange and contacts on said signal receiving relays closing circuits for the connection of the subscriber's line to the selected junction line over an operating bar for cross-bar switches pertaining to the selection stage at the auxiliary exchange.

The invention will be more closely described with reference to the accompanying drawings, in which Figs. 1–9 show an embodiment and Figs. 10–14 another embodiment of the invention.

Fig. 1 and Figs. 10–11 show selection stages in an auxiliary exchange and relays for call-marking.

Fig. 2 and Fig. 12 show the markers at the auxiliary exchange.

Fig. 3 and Fig. 13 show a selection stage at the main exchange and that part of the marker at the main exchange, which pertains to said selection stage.

Fig. 4 shows registering means pertaining to connecting means, which in this case consist of a group selector at the main exchange.

Fig. 5 shows a cross-bar switch DK which is common to several connecting links T1 and is set by means of the registering means in Fig. 4.

Fig. 6 shows a register finder, a connecting link and a register at the main exchange.

Fig. 7 shows group selecting means GV, combined line-finder and line selector (SLA—SLB) for subscribers' lines connected to the main exchange and a marker M for said lines.

In the two embodiments of the invention shown in the figures, the auxiliary exchanges have no internal connection possibilities, and therefore internal calls within an auxiliary exchange are set up over the main exchange and each such call busies two junction lines between the auxiliary exchange and the main exchange.

Figure 4:
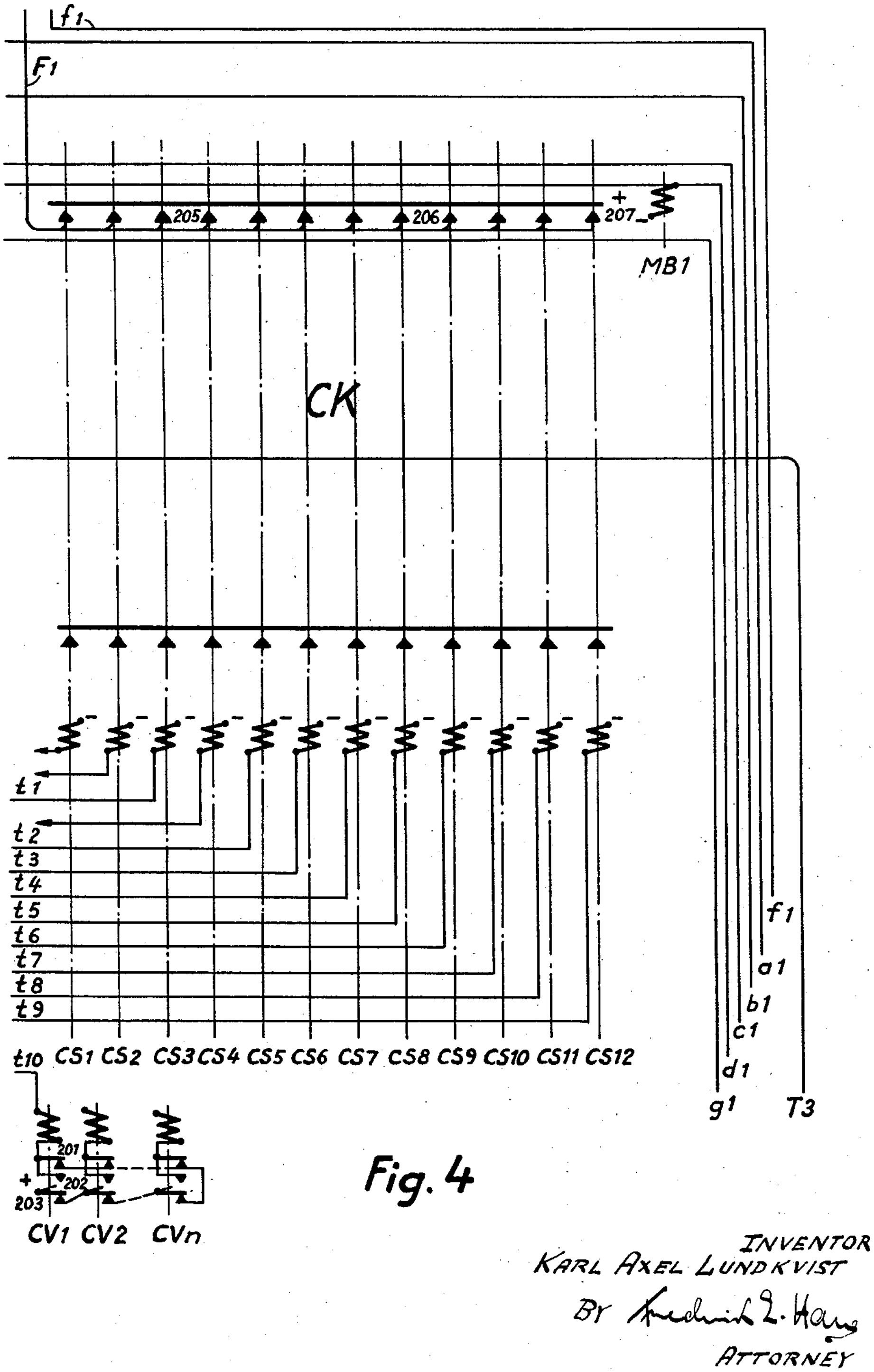

Cross-bar switches are used as well at the main exchange as at the auxiliary exchange. All the cross-bar switches with exception of that one, which is shown in Fig. 4, have 6 selecting bars, each of them with two selecting magnets, and 10 operating bars with an operating magnet each. The cross-bar switch shown in Fig. 4 is of a special construction and has 12 selecting bars, each of them with one selecting magnet.

Figure 1:
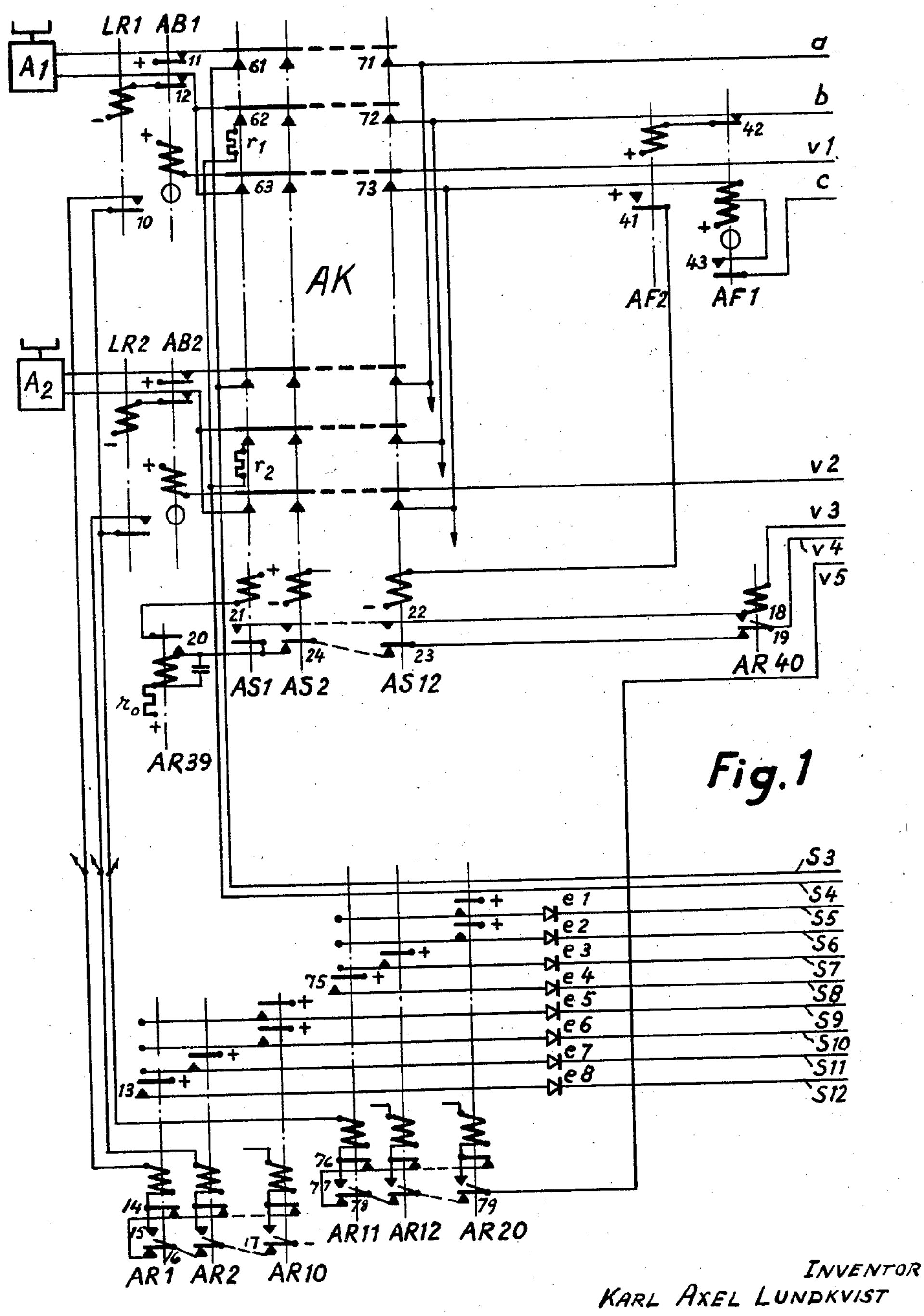
Figs. 1–7 are to be arranged and Fig. 9 shows how Figs. 10–13 must be put together with Figs. 4–7.

The operating magnets AB1 and AB2 in the cross-bar switch AK in Fig. 1 and the relays AF1 for the junction lines *abc* are provided with iron cores, and therefore they hold their armatures attracted through remanance after they have been magnetized. This is indicated by a ring below the magnet-winding. When they are to release their armatures, the core is demagnetized by a current, the direction of which is opposite to the direction of the operating current.

In Fig. 1 A1 and A2 are subscribers' instruments. Each of the corresponding subscribers' lines is provided with an operating bar in a cross-bar switch AK, and a line relay LR1 and LR2, respectively. The operating magnets AB1 and AB2 release the corresponding line relays from the subscribers' lines. The group relays AR1—

AR20 are common to 200 line relays and upper contact in the closing contact 10 is, for all the subscribers' lines having the same units digit, connected to the same units relays AR1—AR10. The lower contact in contact 10 is, for all the subscribers' lines having the same tens-digit, connected to the same tens-relays AR11—AR20.

At call from the subscriber's instrument A1 the line relay LR1 attracts and contact 10 is closed. The following circuit is closed: +, contacts 34, 33, 32 and 31 in Fig. 2, wire *v5*, the in series connected breaking contacts 78—79 on relays AR11—AR20, contact 76, winding on relay AR11, contact 10, winding on relay AR1, contact 14, the in series connected breaking contacts 16—17 on relays AR1—AR10, to negative. Relays AR1 and AR11 attract their armatures. The contacts 13—16 and 75—78 are operated. Relays AR2—AR10 and AR12—AR20 are released.

Figure 2:
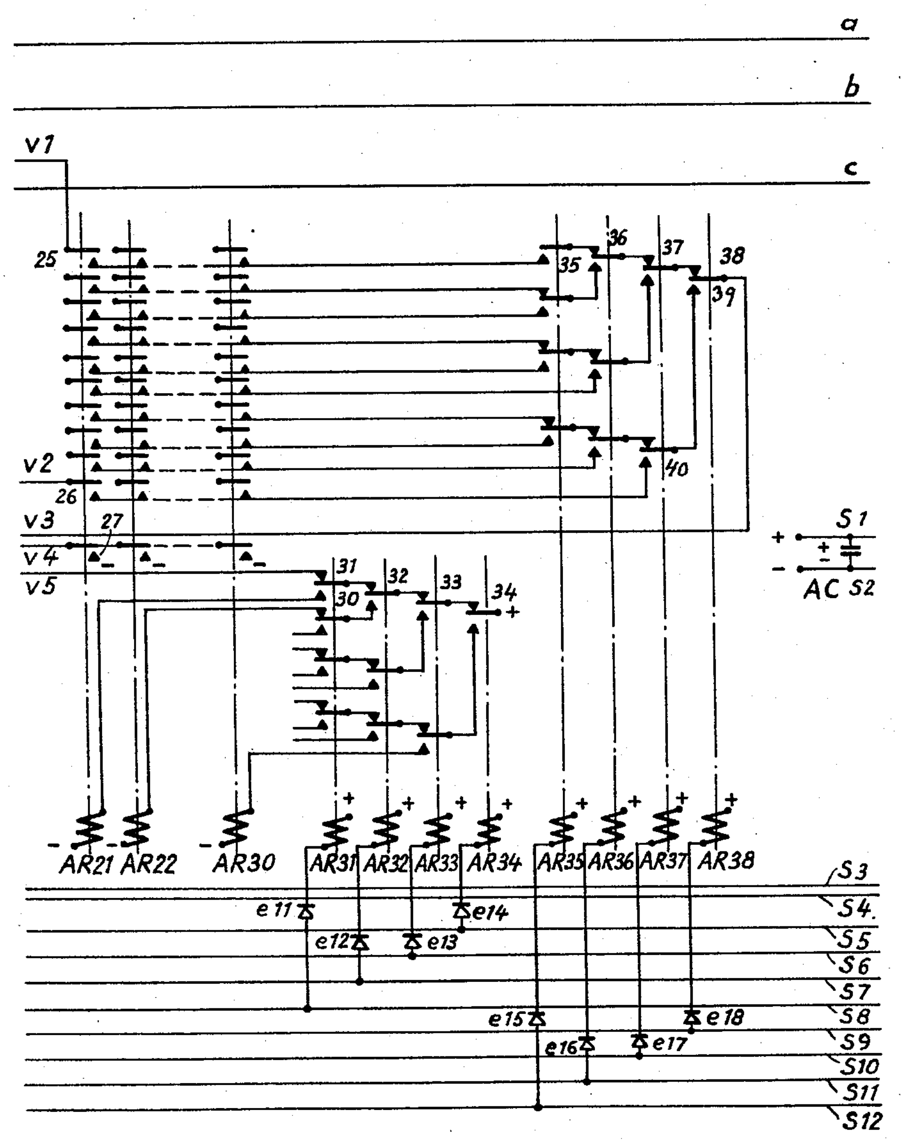

Between the auxiliary exchange, as shown in Figs. 1–2, and the main exchange, are provided junction lines each of which has three wires *a*, *b*, and *c*, and special control lines *s1*—*s12*. The auxiliary exchange has no own exchange battery but the current is supplied from a large electrolytic condenser, AC in Fig. 2, which is kept charged over a special line *s1*—*s2* from the exchange battery BT, Fig. 3, of the main exchange.

Figure 3:
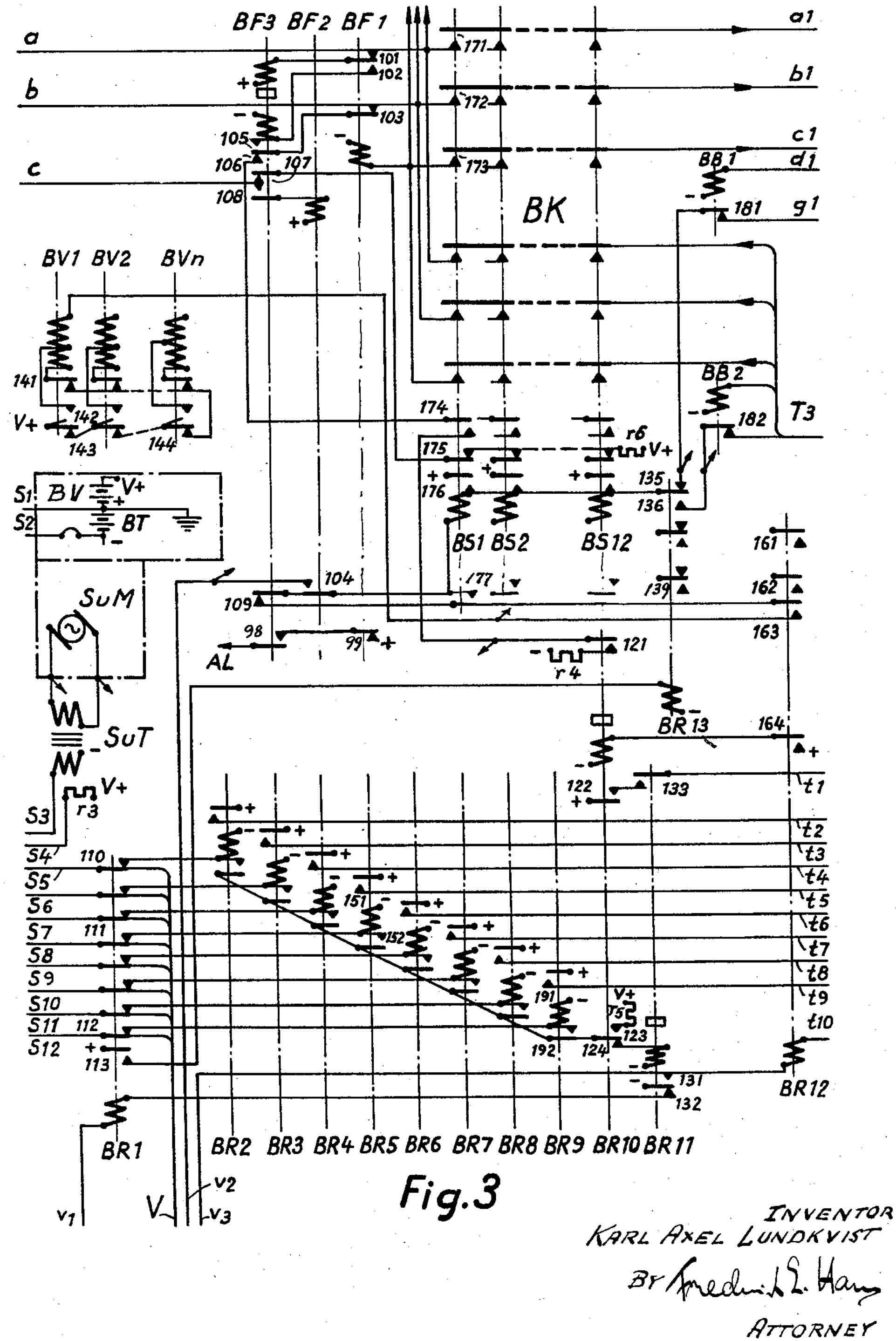

The contacts 13 and 75 close circuits over rectifiers *e8* and *e4*, lines *s12* and *s7* and contacts 112 and 111 for the registering relays BR5 and BR9, Fig. 3, at the main exchange. The relays BR5 and BR9 attract and close the contacts 151—152 and 191—192. The winding on relay BR11 is connected in parallel with the windings on relays BR5 and BR9 and attract their armatures. The contacts 131—133 are actuated. Contact 132 prevents a call from the marker M in Fig. 7.

Contact 131 closes a circuit from contact 203 in Fig. 4 over in series connected breaking contacts on relays CV1–CV*n*, contact 201, winding on relay CV1, wire *t10*, winding on relay BR12, contact 131, to negative. Each of the relays CV1–CV*n* corresponds to an auxiliary exchange connected to the selection stage BK in Fig. 3. Relays BR12 and CV1 attract. Relay BR12 operates the contacts 161—164. The contacts 161—163 close circuits for all the free junction lines between the auxiliary exchange and the main exchange for selection of a free junction line which can be connected with free connecting means consisting in this case of a group selector GA1 in Fig. 7, at the main exchange.

It is assumed, that at the auxiliary exchange all the junction lines can be connected to all the subscribers' lines A1—A2.

Contact 163 closes the following circuit: V+, which is the positive pole of an auxiliary battery BK, contacts 143—144, contact 141, the lower and the upper windings on selecting relay BV1, contacts 163 and 109, winding on selecting magnet BS1, contact 135, a number of parallel circuits as over contact 181, wire *g1*, winding on selecting magnet ES1 in Fig. 6, contacts 412 and 414—415 to negative. The lower winding of relay BV1 has high resistance compared with the windings on selecting magnets BS1 and ES1. The junction lines *abc* are furthermore connected to different cross-bar switches BK and comprise a selecting magnet BS1 with pertaining vertical row of contact spring sets 171—173. It is assumed that relay BV1 attracts its armature. The contacts 141—143 are operated. The lower winding of relay BV is short-circuited by contact 142, and selecting magnet BS1 attracts its armature. Contacts 174—177 are operated. Contact 176 connects + to contact 135, which causes one of the selecting magnets ES1—ES12 to be attracted. It is here assumed that selecting magnet ES1 attracts its armature. The contacts 411—414 are operated.

Figure 7:
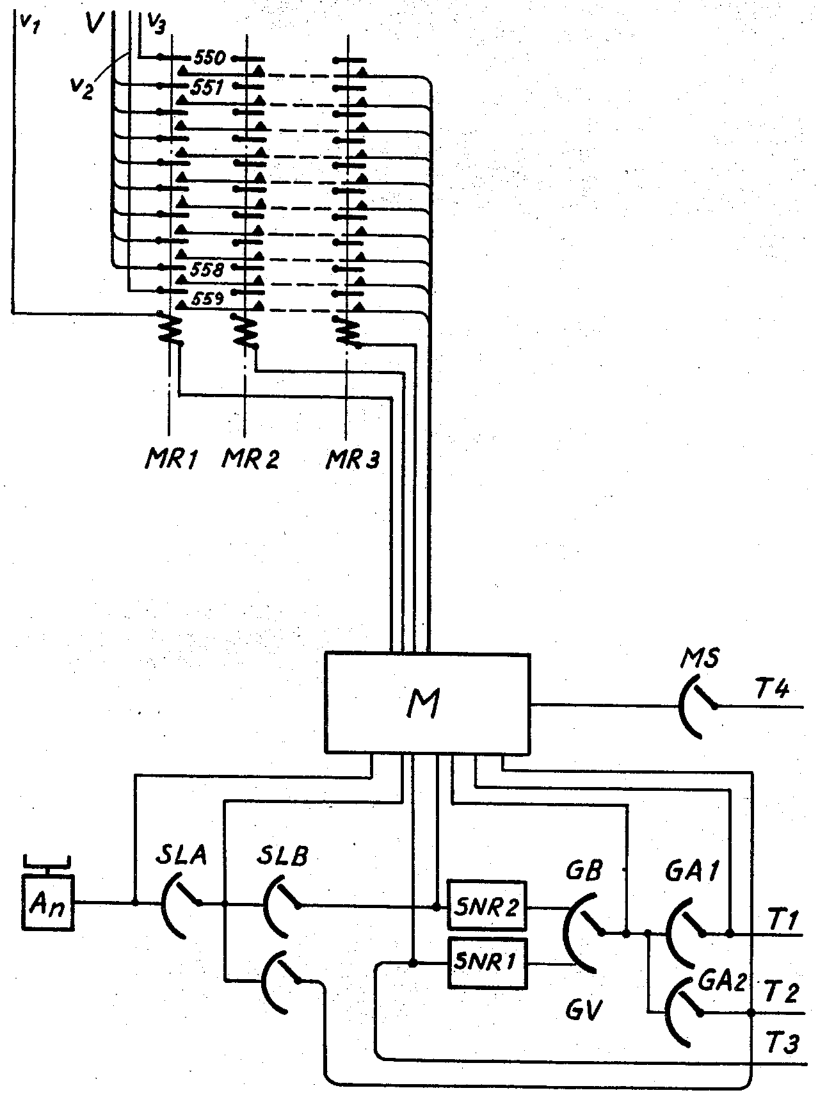
Figure 8:
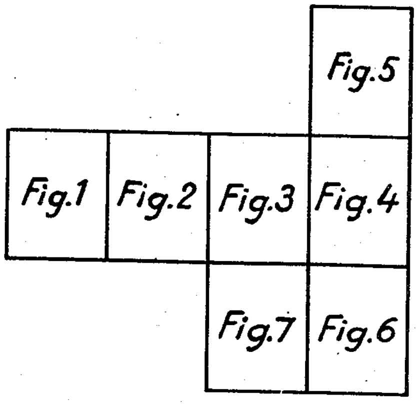
Fig. 8 shows how
Figure 9:
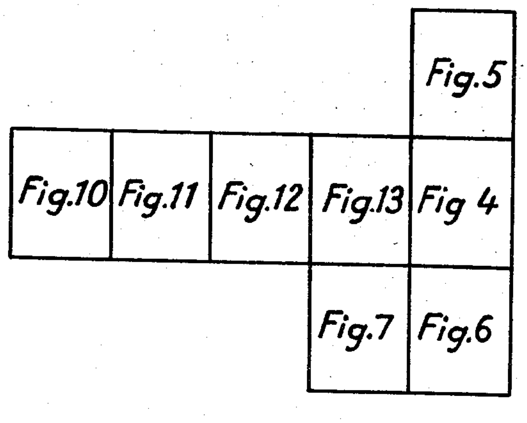

Selecting magnet ES1 pertains to a connecting link T1 comprising wires *a1*—*f1* and relays NR1—NR2, which link connects an operating bar for cross-bar switches with the operating magnet BB1 in Fig. 3 to a selector GA1 in the group selecting means GV in Fig. 7. The selecting magnet ES1 indicates a number of registers REG1, which can be connected to the connecting link T1 over the register selector RS1.

Figure 6:
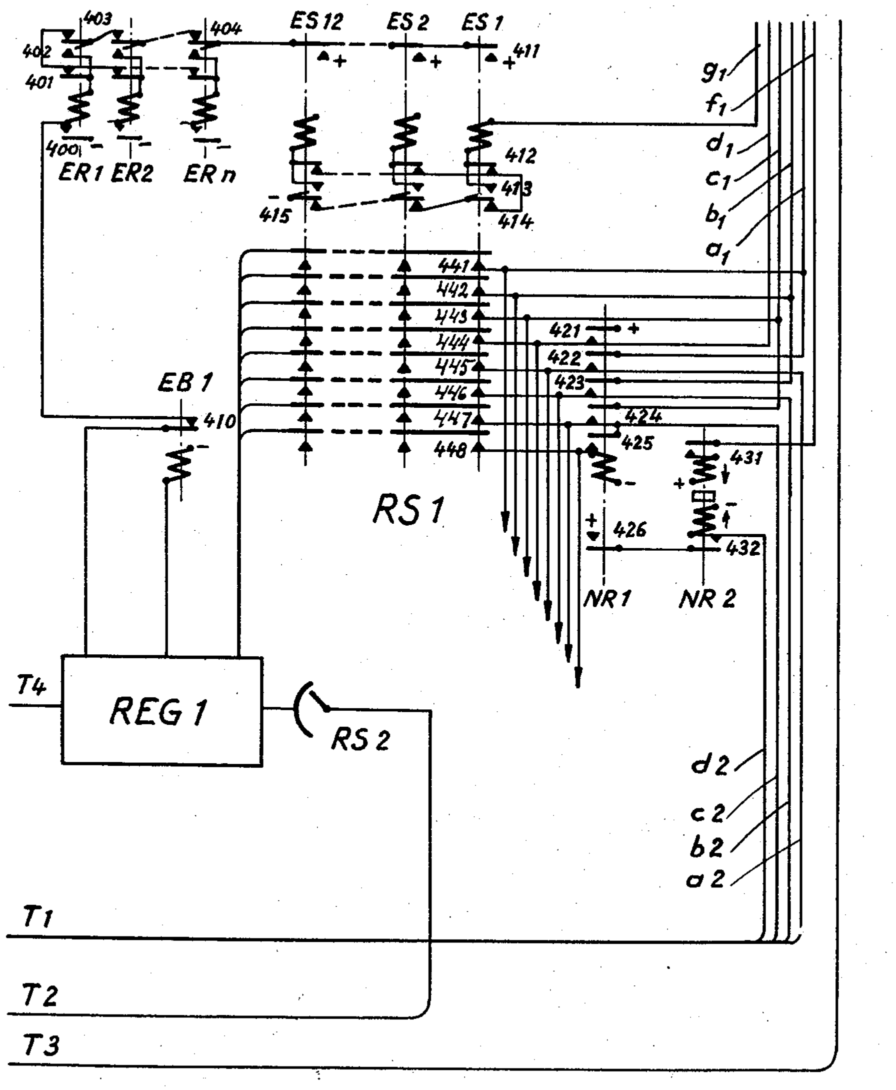

The contact 411 in Fig. 6 closes the circuit for selection of a free register by means of the selecting relays ER1—ER*n*. The following circuit is closed: +, contacts 411, 404—403, 401, winding on relay ER1, contact 410 to register REG1. Relay ER1 attracts its armature and operates the contacts 400—403. The register operates its operating magnet EB1. The contacts 441—448 are thereby closed and contact 410 releases. From the register a circuit is closed from + to contact 444, wire *d1*, winding on operating magnet BB1 in Fig. 3, to negative. The operating magnet BB1 attracts its armature. The contacts 181 and 171—173 are operated. The register referred to above may comprise a relay connected in series wtih the contact 410 and the winding of relay ER1 to a voltage more negative than the voltage applied to contact 400. This relay is preferably of the slow acting and slow releasing type and functions to operate magnet EB1. Register circuits such as register REG1 are fully described in U. S. Patent 2,727,947.

Simultaneously with the connection of the register the following connecting process has taken place: contact 164 closes a circuit for BR10, which attracts and operates the contacts 121—124. The current through relay BR11 is broken by contact 124, but the relay is slow-operating and remains attracted during the following process. Contact 121 closes the following circuit: +, winding on relay AF2 in Fig. 1, contact 42, wire *b*, contacts 103, 106, 174 and 121, resistance *r4* to negative. Relay AF2 attracts. Contact 41 is closed and selecting magnet AS12 attracts. The contacts 22—23 are operated. Contact 123 closes the following parallel circuits: V+, resistance *r5*, contact 123, contacts 192 and 152, 112 and 111, wires S11 and S7, rectifiers *e15* and *e11*, windings on relays AR35 and AR31 to +. The relays AR31 and AR35 attract and operate their contacts. The contacts 30—31 and 35 are operated. Contact 31 breaks the current for the relays AR1—AR20, which release their armatures. Contact 30 closes a circuit for relay AR21, which attracts its armature. The contacts 25—27 are operated. The following circuit is closed: +, winding on operating magnet AB1, wire *v1*, contacts 25, 35, 36, 37, 38, wire *v3*, winding on relay AR40, contacts 22 and 19, wire *v4*, contact 27, to negative. Relay AR40 and operating magnet AB1 attract their armatures. The contacts 18—19, 11—12 and 71—73 are operated. Contact 73 connects the upper and the lower winding of relay AF1 in series and in parallel with the winding on operating magnet AB1. Relay AF1 is magnetized and attracts its armature. The contacts 42—43 are operated. The relays LR1 and AF2 release their armatures.

When contact 173 in Fig. 3 closes, a circuit is closed from the register REG1 in Fig. 6 over contact 443, wire *c1*, contact 173 in Fig. 3, winding on relay BF1, to negative. Relay BF1 attracts and operates the contacts 101—103 and 99. Relay BF3 is energized through both its windings over contact 102, attracts its armature and operates the contacts 105—109 and 98. Selecting magnet BS1 is kept energized over contact 177.

A connection has thereby been set up between the subscriber's instrument A1 in Fig. 1 and register REG1 in Fig. 6 over contacts 71—72, line *a*—*b*, contacts 171—172, wires *a1*—*b1* and contacts 441—442. The connection is maintained by means of current supplied from the register over the loop, since the contact bar corresponding to contacts 441, 442, etc. is connected to a positive source of voltage within the register REG1. While the connection is set up according to the preceding description, the number of the calling subscriber is registered in the operating bar in a cross-bar switch CK corresponding to the operating magnet MB1 in Fig. 4. The cross-bar switch CK has 12 selecting magnets CS1–CS12 independent of each other. The first four selecting magnets CS1–CS4 in combination indicate the hundreds-digit, the four intermediate ones CS5–CS8 indicate the tens-digit, and the last ones CS9–CS12 indicate the units digit in the subscriber's number. The selecting magnet CS3 is operated over the contacts 122 and 133 and the wire *t*1 in Fig. 3. The selecting magnet CS8 is operated over contact 151 and wire *t*5, and selecting magnet CS12 over contact 191 and wire *t*9. When the register connects + to wire *c*1 the operating magnet MB1 attracts simultaneously with the operating magnet BB1. The contacts 205—207 are closed.

When relay BR11 releases its armature the contacts 131 opens. Relay BR12 releases its armature. Contact 163 breaks the circuit for the selecting magnet BS1 and the relay BV1, which release their armature. Selecting magnet ES1 and relay ER1 release their armatures. The relays BR10, BR5, BR9 and AR31, AR35 and AR21 release their armatures, whereafter a new call can be set. After the subscriber's instrument A1 has been connected to the register REG1, said register is set by means of impulses from the dial of the subscriber's instrument. The register connects itself to a marker M in Fig. 7 over a selector MS and a bunch T4 of wires. If the call is directed to a subscriber's instrument A*n* at the main exchange the marker sets the selectors GA1—GB and SLA—SLB, whereafter the subscribers' instruments A1 and A*n* are supplied with current from a link circuit SNR2.

If the call is directed to the auxiliary exchange in Figs. 1–2 a circuit is closed from the marker through the connecting relay MR1 in Fig. 7, wire *v*1, breaking relay BR1 in Fig. 3, contact 132 to negative. The relays MR1 and BR1 operate. The contacts 550—559 and 110—113 are actuated. The control lines *a*5—*a*12 are connected to the marker, which connects V+ to the wires, which in combination correspond to the number of the called subscriber's instrument, for example the number of A2. At the same time, the marker M connects the negative pole of the battery to the wire *v*3, and the relays BR12 and CV1 attract as described above. Contact 113 closes a circuit for relay BR13, which operates and actuates the contacts 135—139. The circuits for selection of a free operating bar in the cross-bar switch BK is thereby switched from operating bars for incoming traffic from the auxiliary exchange to operating bars for outgoing traffic to the auxiliary exchange. The selection of a free operating bar and a free junction line takes place as described above. Contact 163 closes the following circuit: V+, contacts 143—144, contact 141, windings on relay BV1, contacts 163 and 109 (or a circuit for another junction line corresponding to these relays), selecting magnet BS1, contacts 136 and 182, a wire in the bunch T3 of wires, link circuit SNR1 to negative in the marker M. Relay BV1 and selecting magnet BS1 attracts. The marker selects the link circuit SNR1 and connects the selectors GA1 and GB to said link circuit.

Relay AF2 in Fig. 1 or the corresponding relay for another junction line attracts its armature in the circuit described above over wire *b* and resistance *r*4 in Fig. 3. The selecting magnet AS12 operates the contacts 22—23. Simultaneously the relays AR31, AR37, AR38 and AR21 have attracted their armatures. The contacts 31—30, 37 and 40 as well as 38—39 and 25—27 are operated. The following circuit is closed: +, winding on operating magnet AB2, wire *v*2, contacts 26, 40, 39, wire *v*3, winding on relay AR40, contacts 22, 19, wire *v*4, contact 27, to negative. The operating magnet AB2 is energized and the subscriber's instrument A2 is connected to the selected junction line. Hereafter the marker M and the register REG1 are released.

If the marker M connects a call to a busy subscriber's instrument at the auxiliary exchange, for example A1, the following circuit is closed: +, winding on relay BR2 in Fig. 3 for the junction line connected to the subscriber's instrument A1, contact 108, wire *c*, contact 43, the upper winding on relay AF1 in Fig. 1, contact 73, wire *v*1, contacts 25, 35—38, wire *v*3, winding on relay AR40, contacts 22, 19 (18), wire *v*4, contact 27, to negative. Relay BF2 is energized. Contact 104 closes. The following circuit is closed: from a selecting relay in the marker M in Fig. 7, a wire in the bunch T3 of wires, a contact 182 in Fig. 3, contact 136, winding on selecting magnet BS1, contact 104, wire *v*2, contact 559 to a relay in the marker M, which attracts its armature and indicates that the called subscriber's instrument is busy. The marker may thereafter either operate the selecting magnet (BS1) of the junction line connected to the called subscriber's instrument and set up the call to said junction line by connecting V+ to wire *v*2 and breaking the current over wire *v*3, or emit a busy-signal to the calling subscriber.

Figure 5:
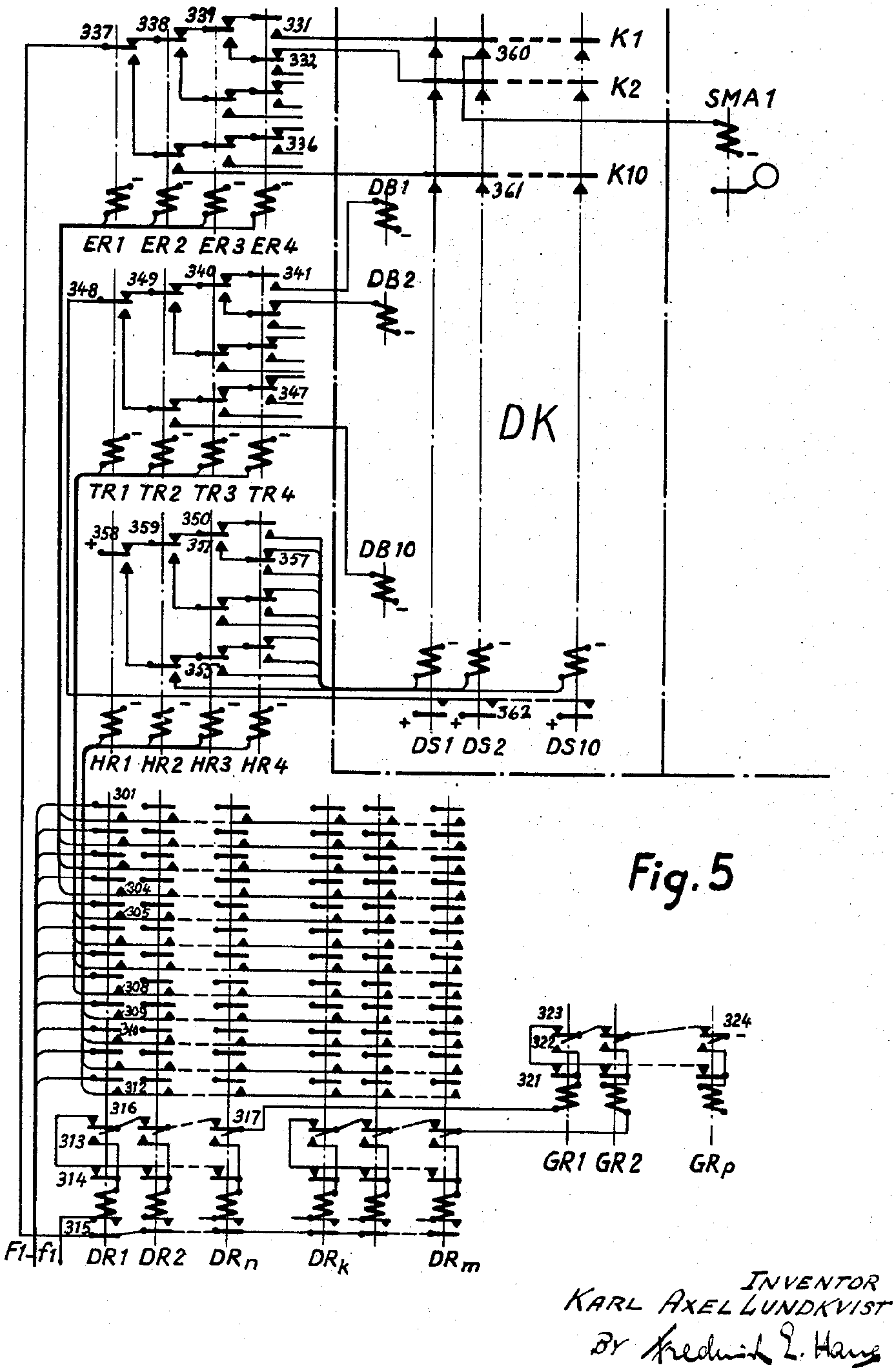

When a communication has been set up from a subscriber's instrument, for example A1, connected to the auxiliary exchange, and the register REG1 is released, relay NR1 in Fig. 6 is operated. The contacts 421—426 are operated. The calling subscriber's instrument is supplied with current from a link circuit SNR1 or SNR2 and relay NR1 is kept energized from said link circuit over wire *c*2 in the bunch T1 of wires and contact 425. Contact 421 keeps the operating magnets BB1 and MB1 energized. The contacts 421—423 connect the wires *a*1, *b*1, *c*1 with *a*2, *b*2, *c*2. When the communication is to be charged, a current impulse is emitted over wire *d*2 to relay NR2, which attracts its armature. The contacts 431—432 are closed. Relay NR2 is kept energized through its lower winding over contacts 426 and 432. The following circuit is closed: +, the upper winding on relay NR2, contact 431, wire *f*1, winding on relay DR1 in Fig. 5, contacts 314, 316—317, winding on relay GR1, contacts 321, 323—324 to negative. Relays DR1 and GR1 attract their armatures if the cross-bar switch DK in Fig. 5 is free.

The cross-bar switch DK is common for 1000 subscribers pertaining to 10 auxiliary exchanges, and each connecting link *a*1–*f*1, T1 is provided with a relay DR1—DR*n*, DR*k*—DR*m* in Fig. 4. The connecting links are divided into groups, each of which has a relay set GR1—GR*p*.

Relay DR1 connects the bunch F1 of wires from the operating bar corresponding to the magnet MB1 in the cross-bar switch CK. The contacts 301—316 and 321—323 are operated. The following circuits are closed: +, contacts 205 and 310, relay HR3 to negative; +, contacts 206, 305, winding on relay TR4 to negative; +, contacts 207 and 301, winding on relay ER4 to negative. The relays HR3, TR4 and ER4 attract their armatures. The contacts 350—355, 341—347 and 331—336 are operated. The selecting magnet DS2 is energized over contacts 358, 359, 351 and 357 and attracts. Contact 362 is closed. The operating magnet DB1 attracts its armature by means of current over the contacts 362, 348, 349, 340 and 341. The contacts 360—361 are closed. The following circuit is closed: +, the upper winding on relay NR2 in Fig. 6, contact 431, wire *f*1, contacts 315, 337, 338, 339 and 331, contact 360, winding on the service meter SMA1, to negative. The service meter SMA1 attracts its armature and steps forward one step. Relay NR2 is demagnetized since its upper winding counteracts the lower one. Relay NR2 releases its armature. The current for the service meter is broken. The relays DR1, GR1, HR3, TR4 and ER4 release and the cross-bar switch DK is released. If a call from the subscriber's instrument A1 cannot be answered owing to there being no free junction line relay AR39, which is slow-operating, will attract its armature in the following circuit: +, resistance $r0$, winding on relay AR39, which is connected in parallel with a condenser, contacts 24—23, 19, wire $v4$, contact 27, to negative. Contact 20 is closed. Selecting magnet AS1 is connected in parallel with relay AR39 and operates. Contact 21 is closed and operating magnet AB1 magnetized. Line relay LR1 is short-circuited and the markers at the auxiliary exchange and the main exchange are disconnected. The contacts 61—63 are closed. The following circuit is closed: V+, resistance $r3$ in Fig. 3, wire $s4$, resistance $r1$, contact 62, loop over subscriber's instrument A1, contact 61, wire $s3$, the lower winding on the buzzer transformer S*u*T. A buzzer generator is connected to the upper winding of S*u*T and the calling subscriber hears busy signal. The resistance $r1$ is chosen so that the operating magnet AB1 is kept magnetized with feeble current. When the subscriber replaces his handset, the direction of current changes in the winding of the operating magnet AB1, the operating magnet is demagnetized and releases its armature and the subscriber's line is disconnected. At call from a short-circuited subscriber's line or if the subscriber remains with his handset removed after the end of the communication, the connection is broken by a time measuring device in a known manner. Thereby, the operating magnet BB1 in Fig. 3 releases its armature and the contacts 171—173 open. Relay BF1 releases its armature. The following circuit is closed: +, the upper winding on relay BF3, contact 101, wire *a*, contact 71, the loop over the subscriber's instrument A1, contact 72, wire *b*, contacts 103 and 105, the lower winding on relay BF3, to negative. Relay BF3 is kept energized until the loop is broken. Over the contacts 98 and 99 a circuit for a time alarm device AL is closed.

If relay BF3 also releases its armature at disconnection of a communication, the following circuit is closed: V+, resistance $r6$ in Fig. 3, contacts 175 and 107, wire *c*, contact 43 in Fig. 1, partly through the lower winding on relay AF1 to +, and partly through the upper winding on relay AF1, contact 73, and winding on operating magnet AB1 to +. The upper winding on relay AF1 keeps the relay AF1 magnetized whereas the operating magnet AB1 is demagnetized. When AB1 releases its armature, contact 73 opens and the lower winding on relay AF1 demagnetizes the relay. Contact 43 opens and contact 42 closes. The junction line *abc* are thereafter ready for a new call.

Since the operating magnets AB1—AB2 and relay AF1 are provided with iron cores and the feeding voltage is supplied from the main exchange, no voltage is taken from the auxiliary exchange during a communication. Current impulses of short duration are only required when setting up communications for operation of relays and operating magnets. This means, that no exchange battery is required at the auxiliary exchange, but only one electrolytic condenser AC in Fig. 2, which is kept energized from the battery BT of the main exchange over two wires S1 and S2.

Figure 10:
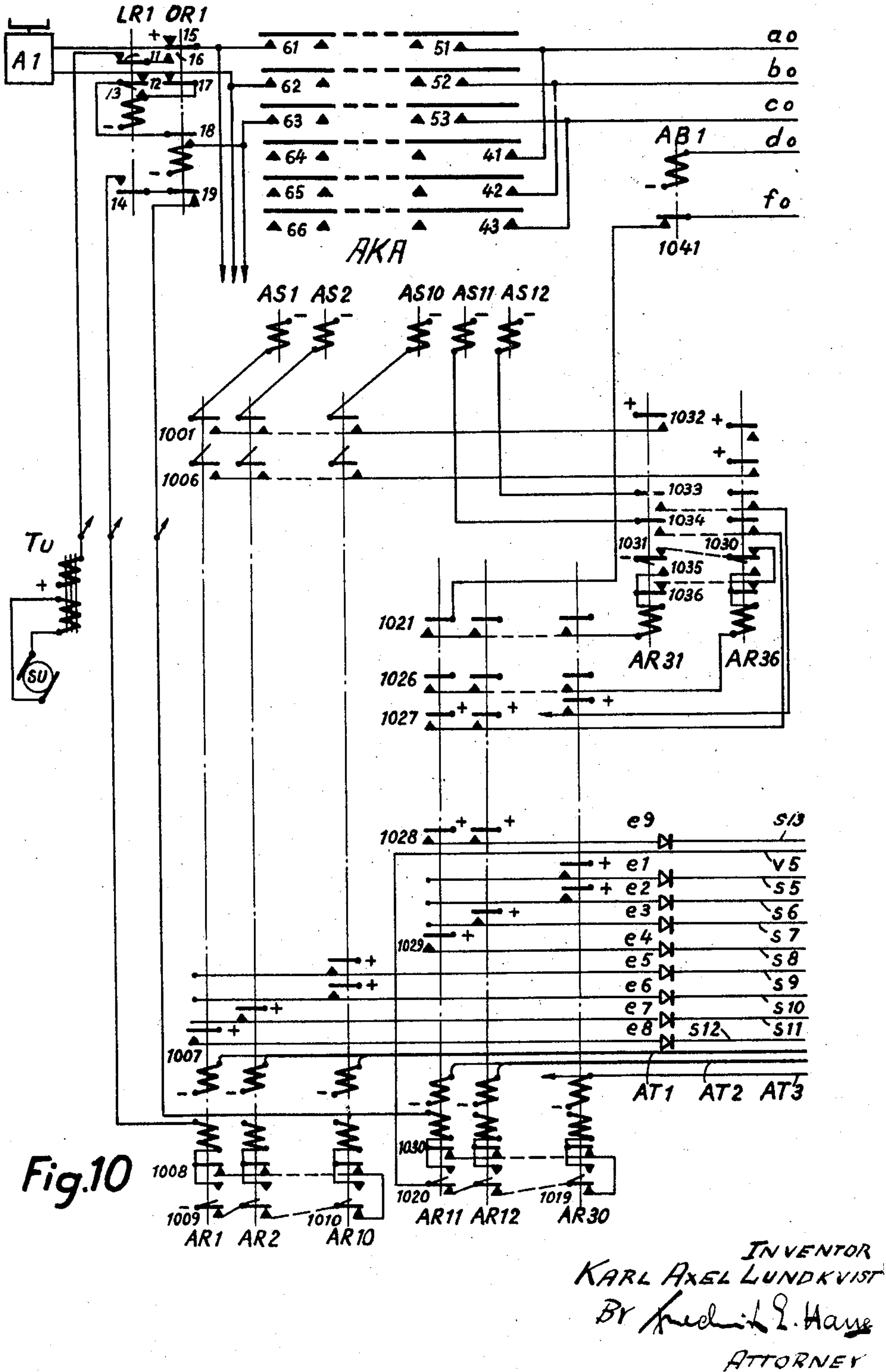
Figure 11:
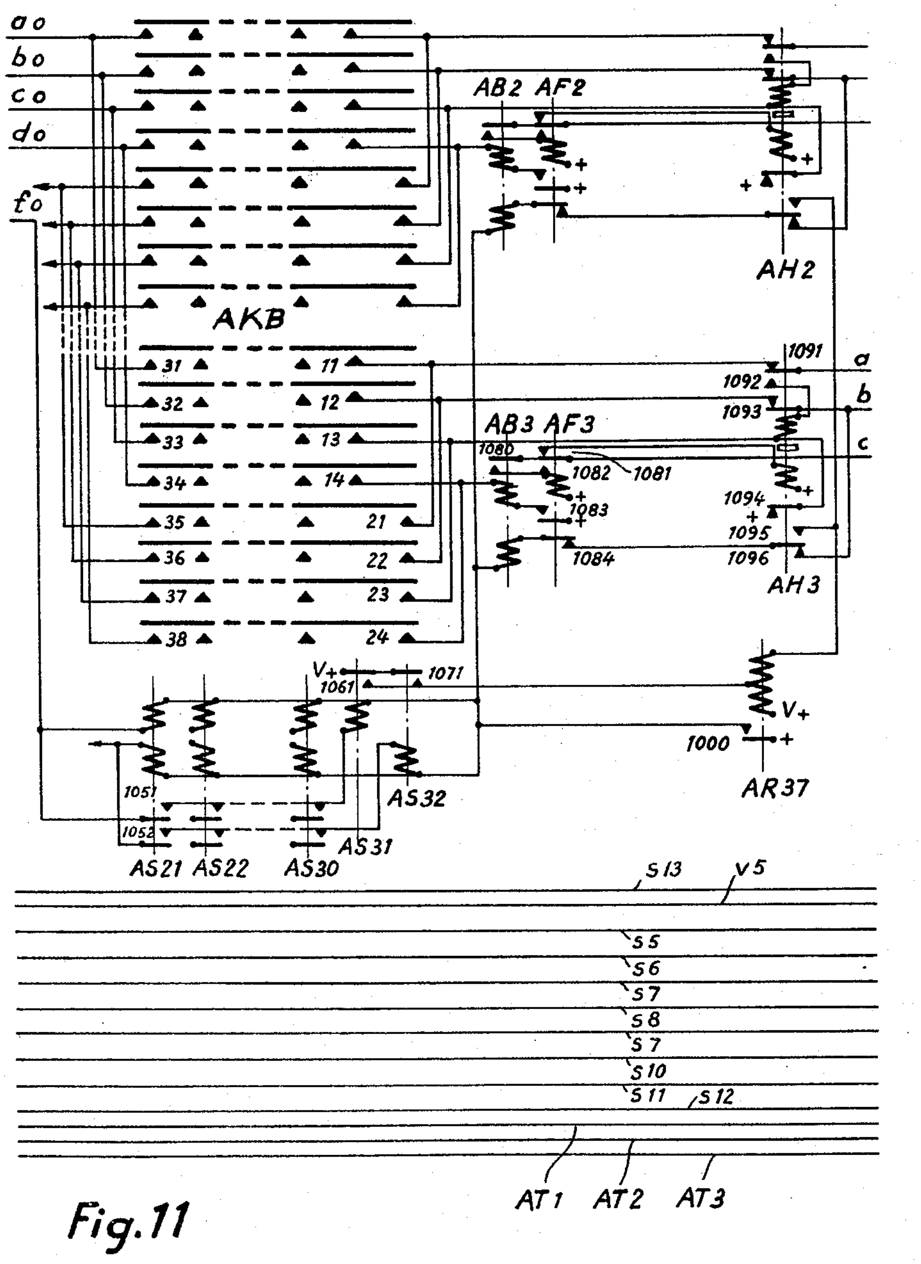
Figure 12:
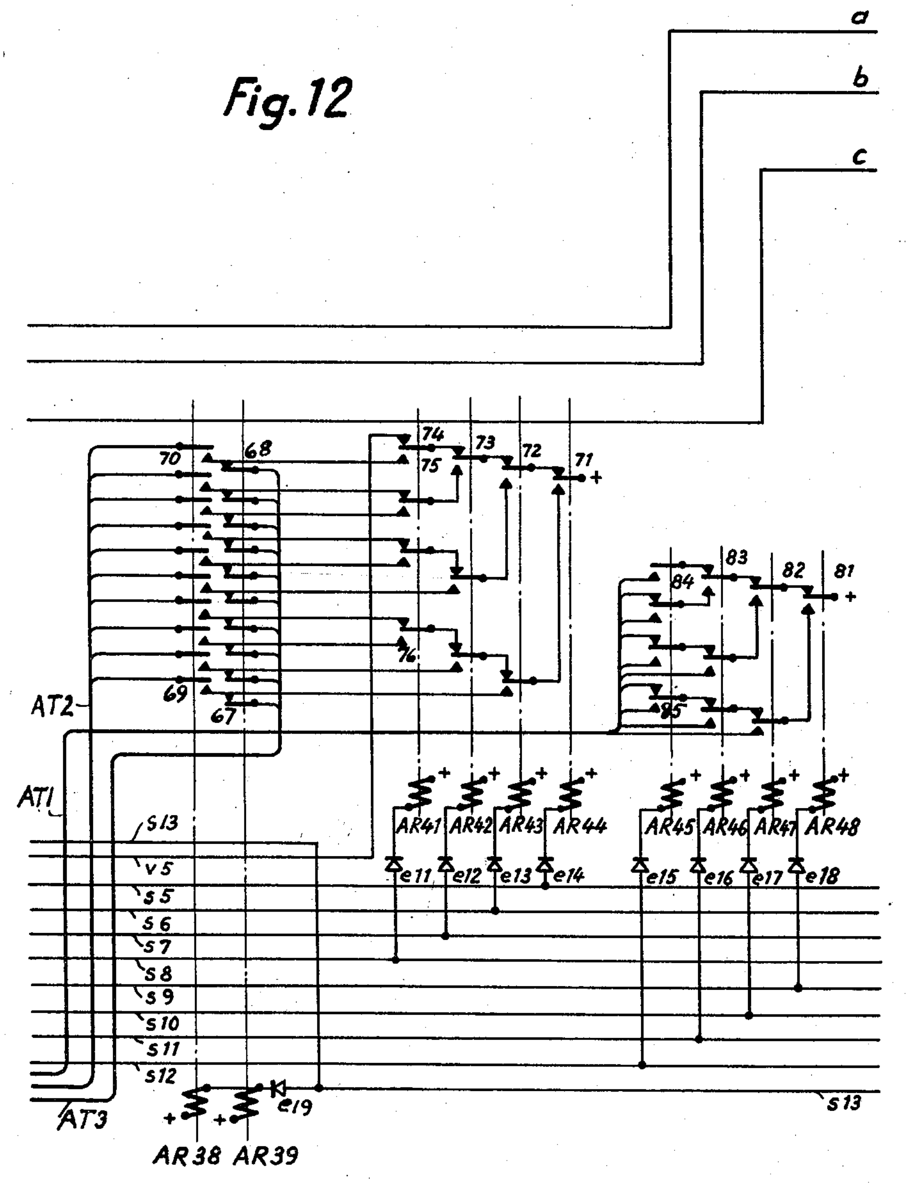

An auxiliary exchange according to Figs. 10–12 comprises 200 subscribers' lines connected to contact spring sets in 6 primary cross-bar switches AKA in Fig. 10. The operating bars in the cross-bar switches AKA are, by means of link $a0$–$f0$, connected to contact spring sets in 3 secondary cross-bar swtiches AKB in Fig. 11, so that each link can be connected with 10 junction lines *abc*. All the operating bars in the cross-bar switches AKA and AKB can be connected with 20 lines arranged in two groups of 10 lines each, said two groups being distinguished from each other by means of a special selecting bar with two selecting magnets AS11—AS12 and AS31—AS32 respectively.

In Fig. 10 each subscriber's line can be connected to 6 links $a0$–$f0$, i. e. one from each one of the said 6 cross-bar switches.

At call from the subscriber's instrument A1 the line relay LR1 attracts with current over contacts 15 and 17. The contacts 11—14 are operated. Contact 14 closes the following circuits: +, contacts 71—74 in Fig. 12, wire $v5$, contacts 1020—1019, contact 1030, the lower winding on relay AR11, contacts 19 and 14, the lower winding on relay AR1, contacts 1008, 1010—1009 to negative. The relays AR1 and AR11 are attracted. The contacts 1001—1009 and 1020—1030 are operated. The relays AR1—AR10 are units relays, i. e. the upper contact spring of all the contacts corresponding to contact 14 and pertaining to the subscribers' lines with the same units digit are united and connected to one of the relays AR1—AR10. Each one of the relays AR11—AR30 represent a tens-digit whereby AR11—AR20 pertain to the tens-digits indicated by the selecting magnet AS12.

Each one of the contacts 1007, 1028 and 1029 closes a circuit from + over a rectifier $e8$ and respectively $e9$ and $e4$, wire $s12$ and respectively $s13$ and $s8$, contact 112 and respectively 113 and 111, winding on relay BR9 and respectively BR14 and BR5, to negative. The relays BR9, BR14 and BR5 attract their armatures. The contacts 151—152, 191—192 and 120—122 are operated. Relay BR11 is energized over contact 124, in parallel with relays BR9, BR14 and BR5, and operates the contacts 131—133. The relays BR12 and CV1 are energized over contact 131 and operate. The contacts 161—165 and 201—203 are operated. Relay BR10 is energized over contact 164 and operates the contacts 123—124. The current is broken through relay BR11, but the relay is slow-releasing and remains operated during the following connecting process. The battery voltage V+ is connected over resistance $r5$ to the wires $s8$, $s12$ and $s13$ over the contacts 152, 192 and respectively 122. The relays AR41, AR38 and AR39 are energized over the rectifiers $e11$, $e15$ and respectively $e19$ and operate the contacts 74—76, 84—85 and respectively 69—70 and 67—68. The circuit through the lower windings of relays AR1 and AR11 is broken by contact 74, but instead of the relays are energized through their upper windings over contacts 84 and respectively 75, wherefore they remain actuated but are held from the main exchange.

Figure 13:
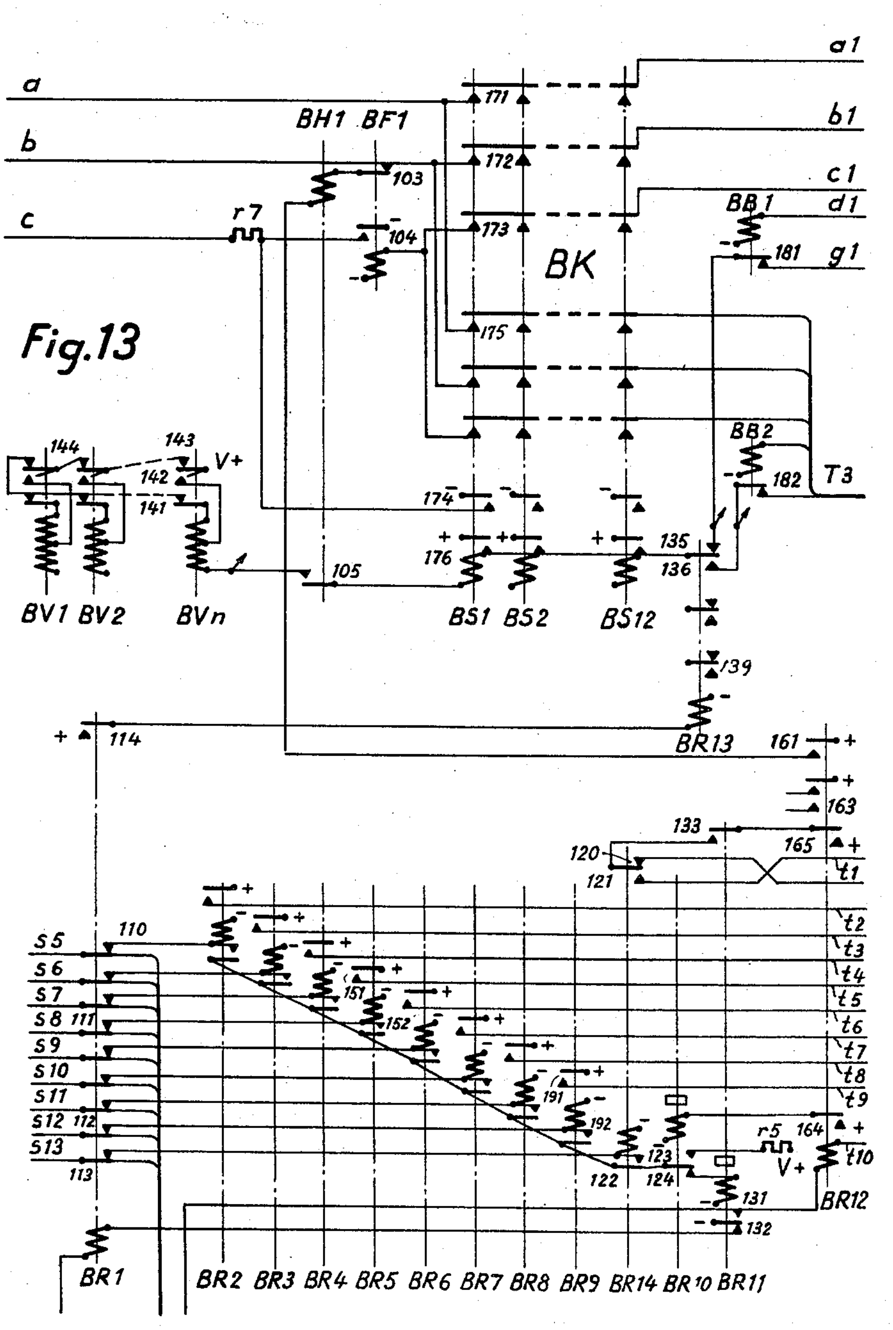

In Fig. 10 the selecting relays AR31—AR36 are connected over the contacts 1021—1026 to circuits for the 6 links $a0$–$f0$, which can be connected to the calling subscriber's instrument A1. One of these circuits is the following: negative, contacts 1031—1030, contact 1026, winding on relay AR31, contacts 1021 and 1041, wire $f0$, the upper winding on selecting magnet AS21, circuits connected in parallel for all the free junction lines outgoing from the cross-bar switch AKB for example through the lower winding on operating magnet AB3, contacts 1084 and 1096, wire *b*, contact 103 in Fig. 13, winding on relay BH1, contact 161, to +. The winding on relay BH1 has high-resistance, and therefore relay BH1 and the relays connected in parallel with it but pertaining to other junction lines operate whereas relay AR31, selecting magnet AS21 and operating magnet AB3 are for the time being not actuated. Contact 105 closes the following circuit: V+, contacts 143—144 and 141, the upper and the lower winding of selecting relay BV*n*, contact 105, winding on selecting magnet BS1, contacts 135 and 181, wire $g1$, winding on selecting magnet ES1 in Fig. 6, contacts 412 and 414—415 to negative. The corresponding circuits are closed for all the free junction lines *abc*, which can be connected to the calling subscriber's instrument A1 in Fig. 10. It is here assumed that the selecting relay BV*n* attracts and operates the contacts 141—143. The upper winding of the relay, which has high-resistance, is short-circuited by contact 142, and selecting magnet BS1 attracts its armature. Contacts 174 and 176 are operated. Selecting magnet ES1 in Fig. 6 is energized over contact 176 and a free register REG1 in Fig. 6 is selected and connected as described in the preceding. The operating magnet BB1 in Fig. 13 is thereby actuated and relay BF1 is energized over contact 173, wire $c1$ and contact 443 from the register REG1. Relay BF1 attracts its armature and operates the contacts 103—104.

When the selecting magnet BS1 operates contact 174 the following circuit is closed: negative, contact 174, resistance *r7*, wire *c*, contact 1081 in Fig. 11, winding on relay AH3, to positive. Relay AG3 attracts its armature and operates the contacts 1091—1096. The following circuit is closed: V+, which is the positive pole of an auxiliary battery at the auxiliary exchange, the lower and the upper windings on relay AR37, contacts 1095 and 1084, the lower winding on operating magnet AB3, the upper winding on selecting magnet AS21, wire *f0*, contacts 1041 and 1021, winding on relay AR31, contacts 1036, 1030—1031 to negative. Relay AR37, the lower winding of which is high resistive, attracts and closes contact 1000. The selecting relay AR31 attracts and operates the contacts 1031—1036. Selecting magnet AS11 is energized over contacts 1034 and 1027, and attracts its armature. Selecting magnet AS21 attracts its armature. Contacts 1051—1052 are closed. The winding on selecting magnet AS31 is connected over contact 1051 in parallel with the upper winding on selecting magnet AS21 and, since relay AR31 is low resistive, selecting magnet AS31 attracts its armature and operates contact 1061.

Each contact spring set in the cross-bar switch AKB comprises contacts for two links (*a0—d0*, *f0*) and each selecting magnet AS21—AS30 indicates two links and is provided with one winding for each link. If a link is selected, for which the wire corresponding to the wire *f0* is connected to the upper winding of a selecting magnet, selecting magnet AS31 is operated. If the wire is connected to the lower winding, selecting magnet AS32 is operated, and actuates contact 1071.

Contact 1061 short-circuits the lower winding on relay AR37 and operating magnet AB3 attracts its armature in the following circuit: V+, contacts 1061, the upper winding on relay AR37, which is low-resistive, contacts 1095 and 1084, the lower winding on operating magnet AB3, contacts 1000, to positive. The operating magnet AB3 attracts its armature. The contacts 31—38, 11—14 and 1080 are closed. Relay AF3 attracts in the following circuit: +, winding on relay AF3, contact 1080, wire *c*, resistance *r7* to negative over one of the contacts 174 and 104. The contacts 1081—1084 are operated. The following circuit is closed: +, contact 183, the upper winding on operating magnet AB3, contacts 14 and 34, wire *d0*, winding on operating magnet AB1, to negative. Operating magnet AB1 attracts its armature and operating magnet AB3 is held in the last mentioned circuit. The contacts 61—66, 51—53 and 1041 are operated. Relay AH3 releases its armature, when contact 1081 breaks and the following circuit is closed: +, contacts 1094, 13 and 33, wire *c0*, contacts 53 and 63, winding on break relay OR1 to negative. Relay OR1 attracts its armature. The contacts 15—19 are operated. Line relay LR1 is kept energized over contacts 18 and 13. Contact 19 breaks the call-circuit to the group relays AR1—AR30. The call is thereby answered to and the subscriber's instrument A1 is connected with the register REG1 over contacts 61—62, 51, 52, link *a0—b0*, contacts 31—32, 11, 12, 1091—1093, line *a—b*, contacts 171—172, wires *a1—b1* and contacts 441—442.

When relay BR11 releases its armature the markers at the auxiliary exchange and the main exchange are disconnected. Simultaneously, the calling subscriber's number has however been registered in the cross-bar switch CK by the operating magnet MB1, in which the contacts 205, 207 have been operated. The hundreds-digit has been indicated by operation of the selecting magnet CS3 alone in the following circuit: +, contacts 165, 133 and 121, wire *t1*, winding on selecting magnet CS3 to negative.

Had the call been set up from a subscriber's instrument pertaining to the other hundreds within the auxiliary exchange, one of relays AR21—AR30 in Fig. 10 would have attracted instead of one of the relays AR11—AR20. Relay BR14 in Fig. 13 would thereby not have been operated and not either the relays AR38 and AR39 in Fig. 12. The selecting magnet AS12 in Fig. 10 or the corresponding magnet would have attracted instead of selecting magnet AS11.

At call to the auxiliary exchange marker M in Fig. 7 connects itself to the control lines *s5—s13* by means of relays MR1 and BR1. The contacts 550—559 and 110—114 are operated. Relay BR13 is energized. The contacts 135—139 are operated. The relays BR12 and CV1 operate. The relays AR41—AR48 are set in combinations, which indicate the units and tens-digits in the number of the called subscriber's instrument. Over wire *s13* the meant hundreds-digit is indicated from the marker by operation or non-operation of the relays AR38 and AR39. One of the relays AR1—AR10 and one of the relays AR11—AR30 are energized through their upper windings and attract. Thereafter the selection of a junction line and of operating bars in the cross-bar switches AKA, AKB and BK takes place in accordance with the preceding.

If the called subscriber is busy the following change of the connecting process in Fig. 11 takes place. In this case + is on wire *c0* and a circuit is closed from +, contact 1094 for the junction line which marks the called subscriber's instrument busy, contacts 13, 33, wire *c0*, contacts 53, 63 for the operating bar, which marks the subscriber's instrument busy, contacts 63, 53, wire *c0* for the link which sets up the call, contacts 33, 13, the upper winding on relay AH3, which is somewhat slow-releasing, contact 1092 and wire *a* for the junction line which sets up the call, contact 175, the bunch T3 of wires, to negative through a test relay in a link circuit SNR in Fig. 7. Said test relay attracts and marks busy and relay AH3 in Fig. 11 is held energized. The connection is thereby broken in contacts 1091 and 1093.

At call from faulty subscribers' lines, for example a short-circuited line, and in the cases, when a subscriber does not replace his handset after the end of the communication, the subscriber's line is automatically blocked. This is obtained by holding the break relay OR1 in Fig. 10 in a loop over the subscriber's line. When the connection over the link *a0—f0* is broken, line relay LR1 releases its armature quicker than break relay OR1 and the following circuit is closed: +, the upper winding on transformer T*u*, which is common to all the subscribers' lines, contacts 11 and 16, the loop over the subscriber's instrument A1, contacts 12 and 18, winding on break relay OR1 to negative. A buzzer generator S*u* is connected to the lower winding of the transformer T*u* and the subscriber hears a busy signal.

I claim:

1. A telephone system comprising, in combination, a main exchange and an auxiliary exchange, a group of subscriber's lines connected with the auxiliary exchange, a line relay individual to each of said lines, group relays controlling contacts located in the auxiliary exchange and operated by said line relays upon a call on one of said subscriber's lines to designate the number of the calling line, at least one cross-bar switch for said subscriber's lines and located at the auxiliary exchange, operating means for said switch, switching means in the main exchange, a plurality of trunks interconnecting said cross-bar switch in the auxiliary exchange and said switching means in the main exchange, registering means in the main exchange connected to said trunks over said switching means calling line identifying relays at the main exchange, said identifying relays controlling a first set and a second set of contacts, auxiliary signalling lines interconnecting said identifying relays with said contacts of the group relays and with said switch operating means in the auxiliary exchange, circuit means closed by said group relays for transmitting signals indicating the number of the calling line over said auxiliary signalling lines to said identifying relays, circuit means closed by the first set of contacts of said identifying relays actuating said switching means in the main exchange for sending revertive signals over the auxiliary signalling lines to said operating means in the auxiliary exchange to establish a connection between the calling line and said registering means, and circuit means closed by the second set of contacts of said identifying relays for setting said registering means in accordance with the number of the calling line.

2. A telephone system according to claim 1, wherein said circuit means include rectifying elements separating said revertive signals from said identifying signals, and wherein both, the revertive and the identifying signals are transmitted over the same line conductors.

3. A telephone system comprising, in combination, a main exchange and an auxiliary exchange, a group of subscriber's lines connected with the auxiliary exchange, a line relay individual to each of said lines, group relays controlling contacts located in the auxiliary exchange and operated by said line relays upon a call on one of said subscriber's lines to designate the number of the calling line, first cross-bar switches for said subscriber's lines and located at the auxiliary exchange, operating means for operating said cross-bar switches, a selecting means and second cross-bar switches located in the main exchange, a plurality of trunks interconnecting the first cross-bar switches in the auxiliary exchange and the second cross-bar switches in the main exchange, a plurality of registers in the main exchange connected to said trunks over said second cross-bar switches calling line identifying relays at the main exchange, auxiliary signalling lines interconnecting said identifying relays with the contacts of said group relays in the auxiliary exchange, idle trunk marking means in the main exchange, circuit means closed by said group relays transmitting signals indicating the number of the calling line over said auxiliary signalling lines to said identifying relays, circuit means closed by said contact of said identifying relays for actuating said trunk marking means to mark all idle trunks which can be connected to the calling line, said selecting means selecting an idle register and one of said idle trunks which can be connected to the selected register and actuating one of said second cross-bar switches to connect the selected register to the selected trunk, and means individual for the selected trunk actuating said switch operating means in the auxiliary exchange and said switch operating means for actuating said first cross-bar switches to connect the calling line to the selected trunk.

References Cited in the file of this patent

UNITED STATES PATENTS

| | | |
|---|---|---|
| 2,369,071 | Ostline | Feb. 6, 1945 |
| 2,369,868 | Taylor et al. | Feb. 20, 1945 |
| 2,532,097 | Hersey | Nov. 28, 1950 |
| 2,588,052 | Shepherd | Mar. 4, 1952 |
| 2,618,708 | Ostline | Nov. 18, 1952 |
| 2,629,016 | Gooderham | Feb. 17, 1953 |